No. 867,536. PATENTED OCT. 1, 1907.
M. D. & R. T. ROCHFORD.
WELL MAKING MACHINE.
APPLICATION FILED MAR. 8, 1904. RENEWED AUG. 22, 1907.
7 SHEETS—SHEET 1.
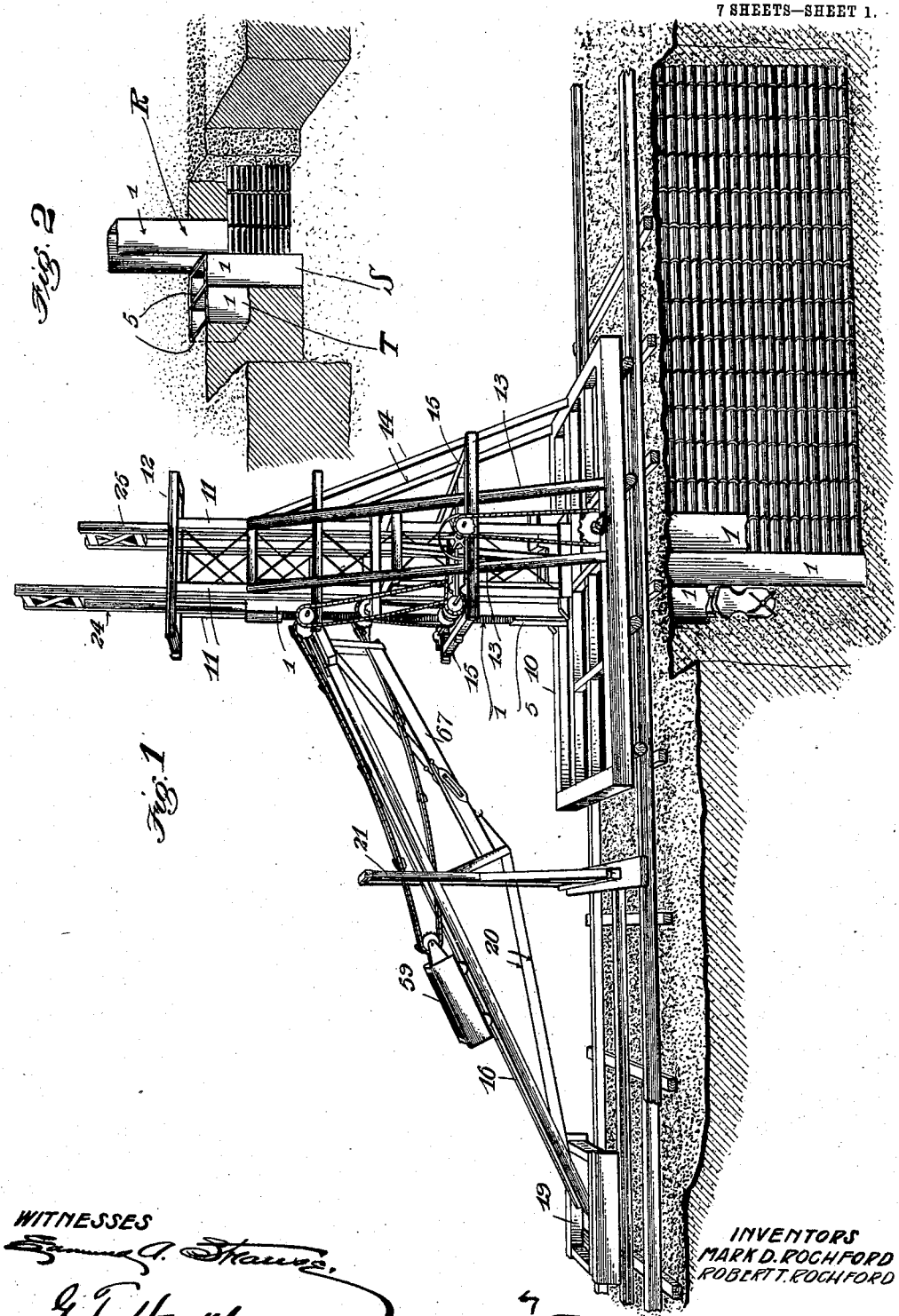
WITNESSES
INVENTORS
MARK D. ROCHFORD
ROBERT T. ROCHFORD

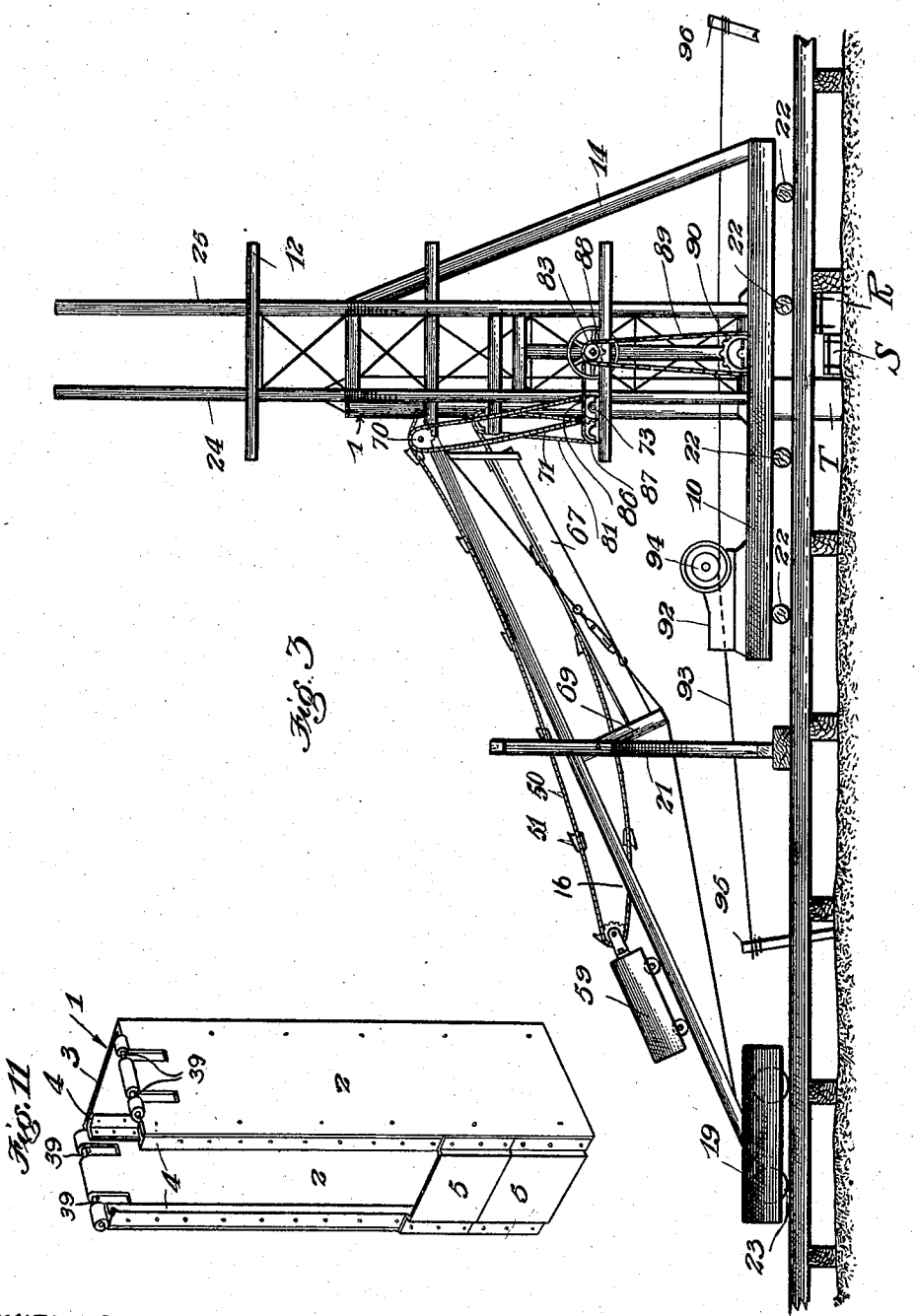

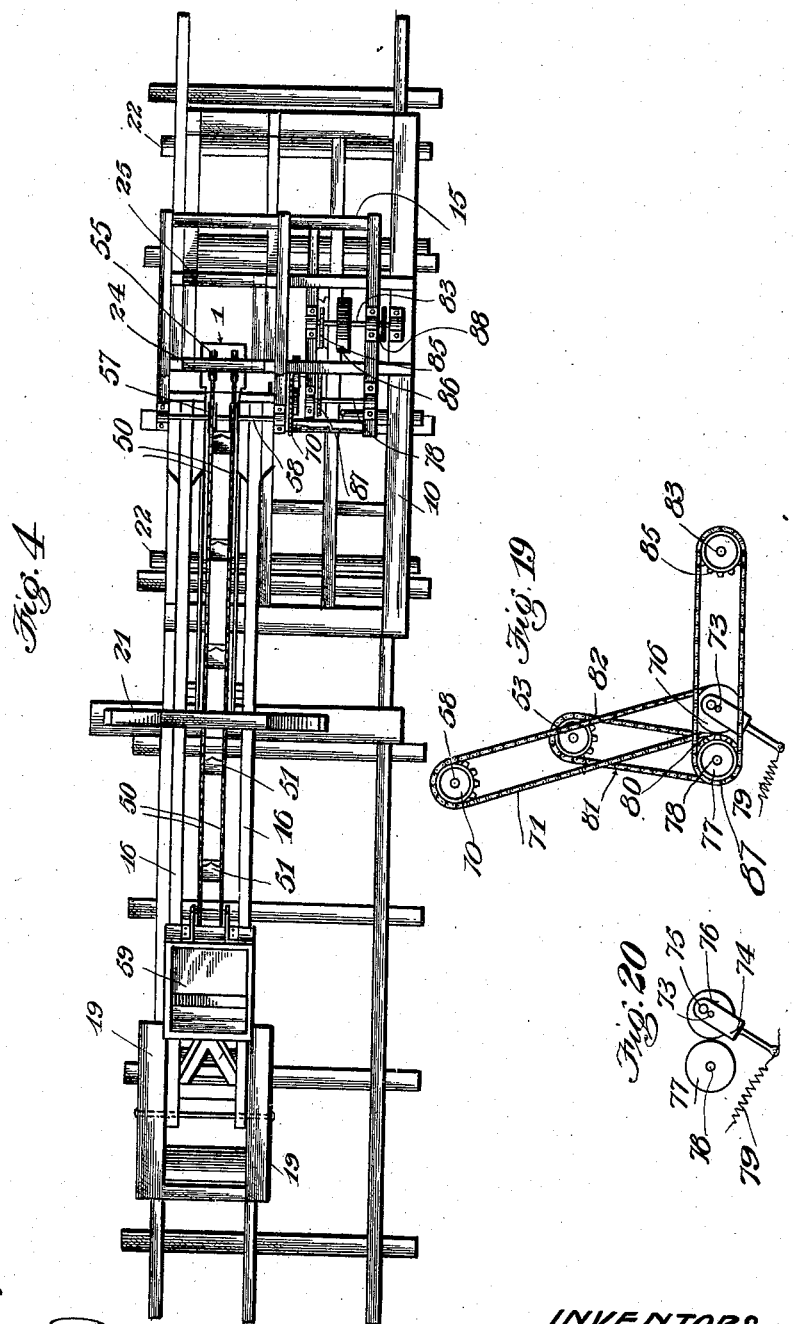

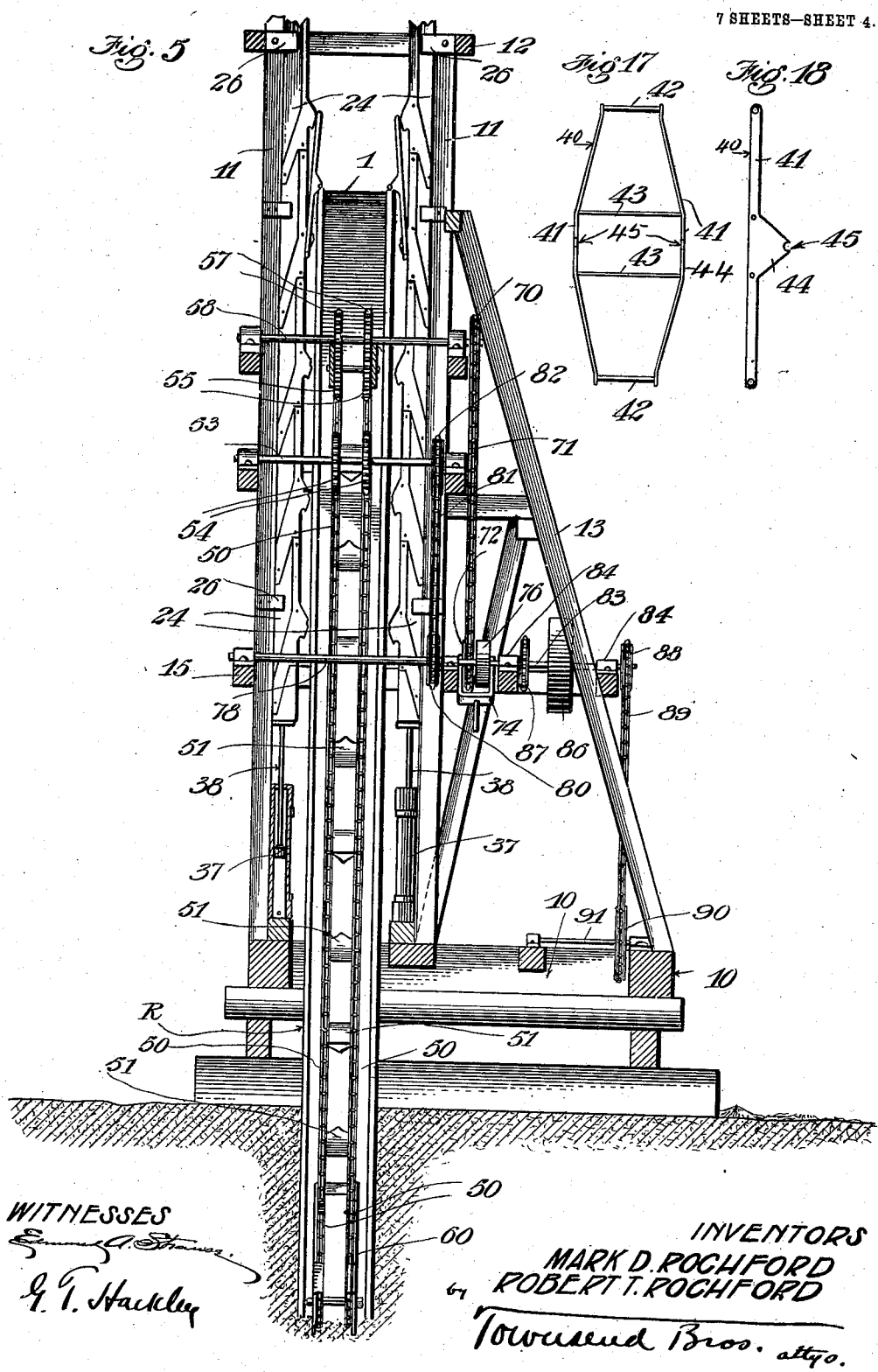

No. 867,536. PATENTED OCT. 1, 1907.
M. D. & R. T. ROCHFORD.
WELL MAKING MACHINE.
APPLICATION FILED MAR. 8, 1904. RENEWED AUG. 22, 1907.
7 SHEETS—SHEET 5.
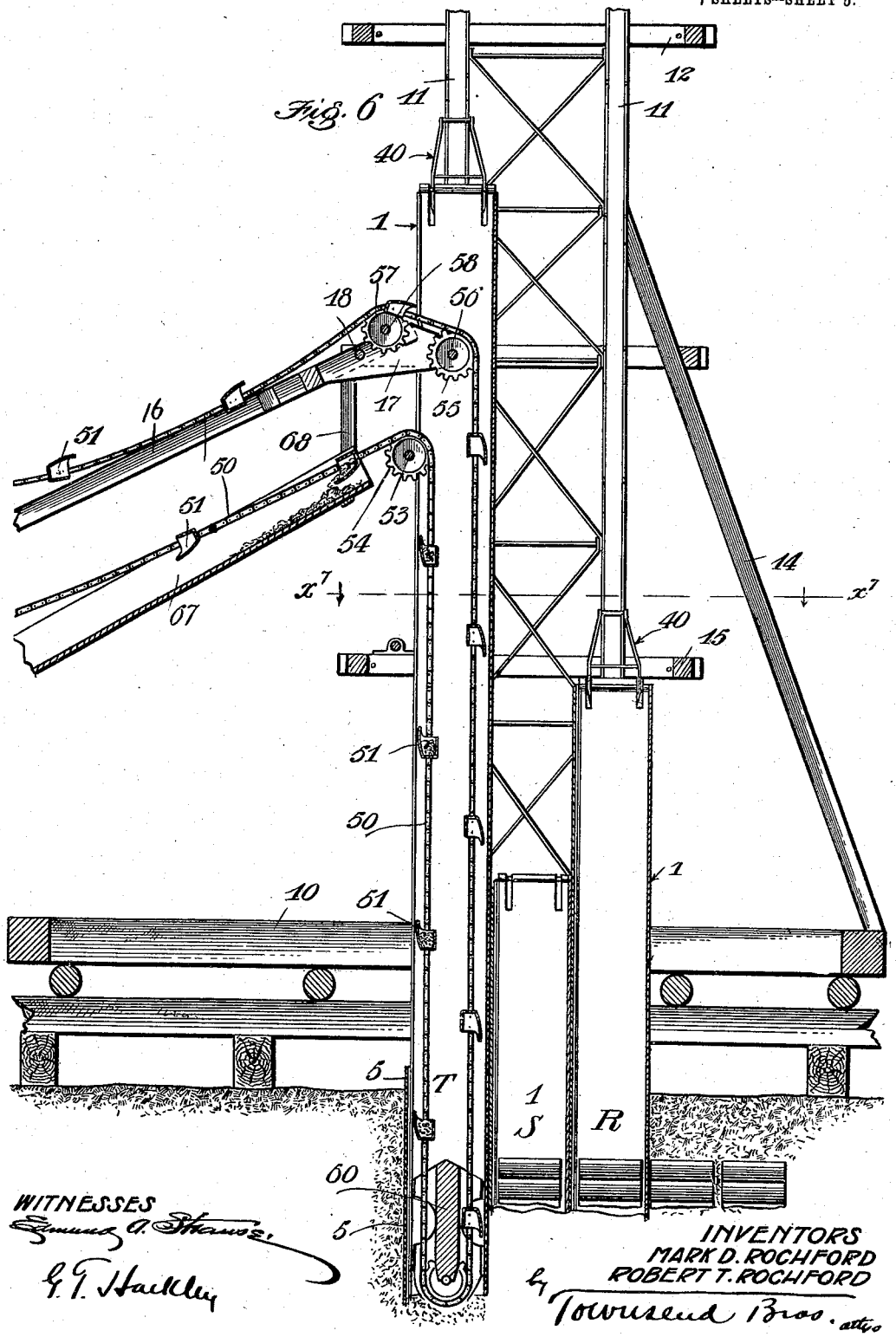
WITNESSES
INVENTORS
MARK D. ROCHFORD
ROBERT T. ROCHFORD
by Townsend Bros., attys No. 867,536. PATENTED OCT. 1, 1907.
M. D. & R. T. ROCHFORD.
WELL MAKING MACHINE.
APPLICATION FILED MAR. 8, 1904. RENEWED AUG. 22, 1907.
7 SHEETS—SHEET 6.
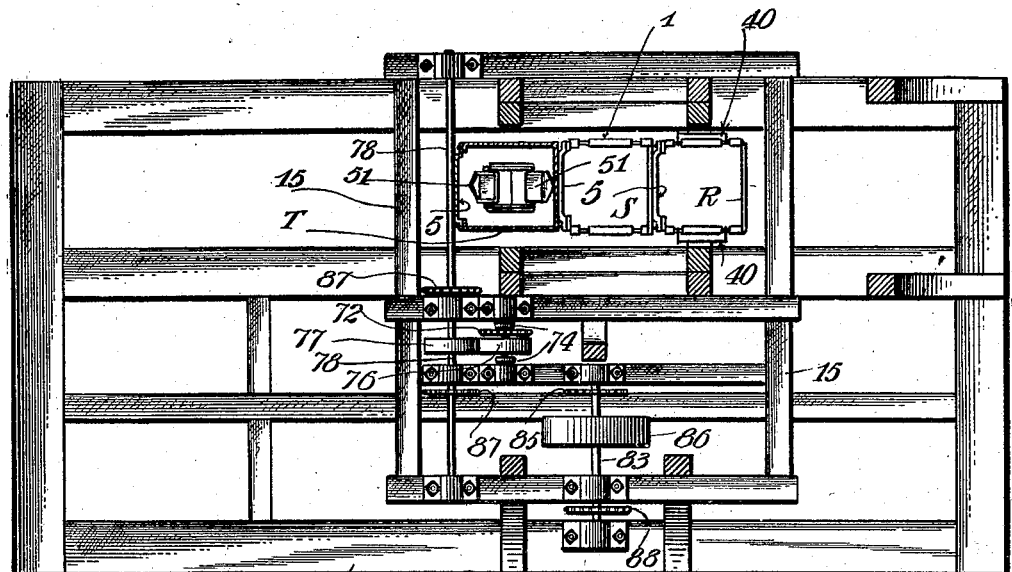
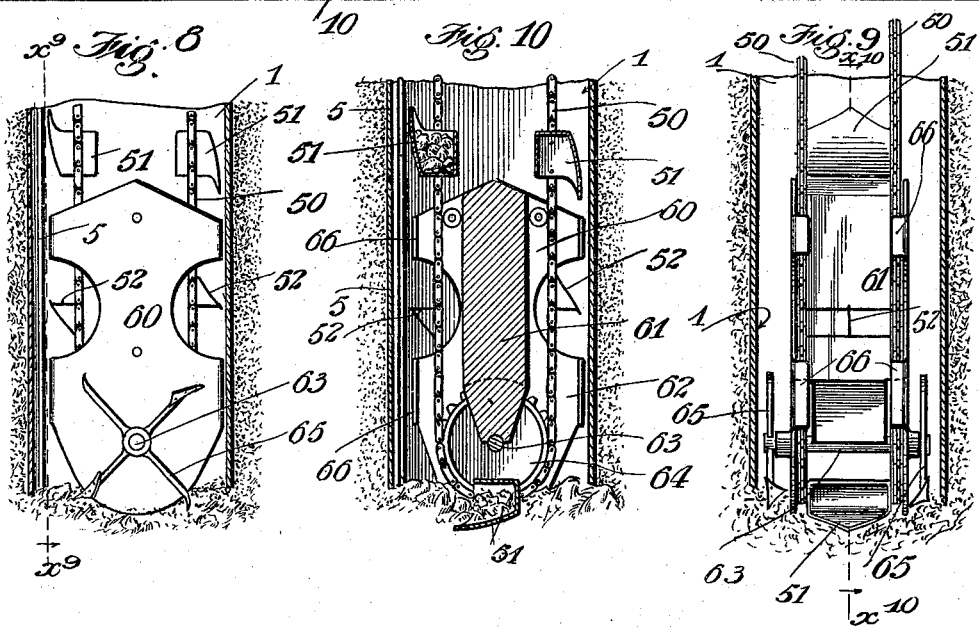
WITNESSES
INVENTORS
MARK D. ROCHFORD
ROBERT T. ROCHFORD
by Townsend Bros.,
attys.

No. 867,536. PATENTED OCT. 1, 1907.
M. D. & R. T. ROCHFORD.
WELL MAKING MACHINE.
APPLICATION FILED MAR. 8, 1904. RENEWED AUG. 22, 1907.
7 SHEETS—SHEET 7.
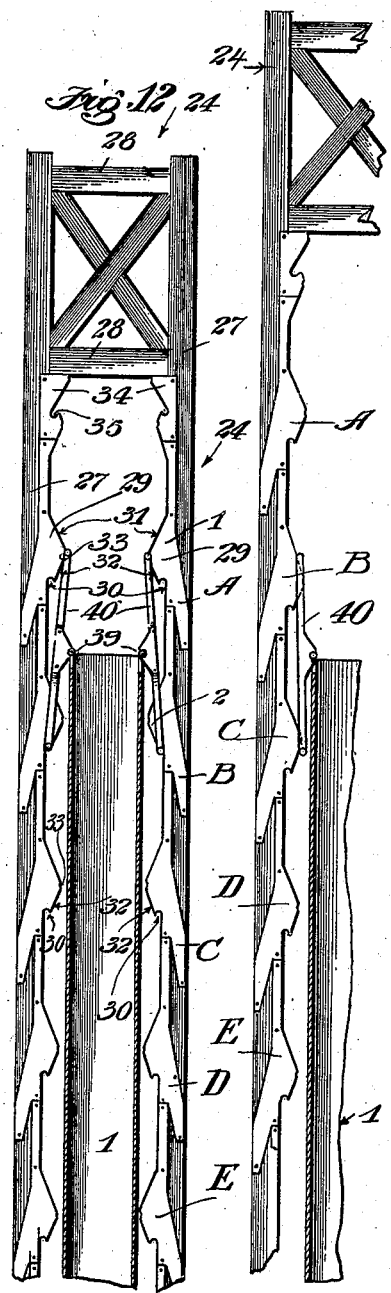
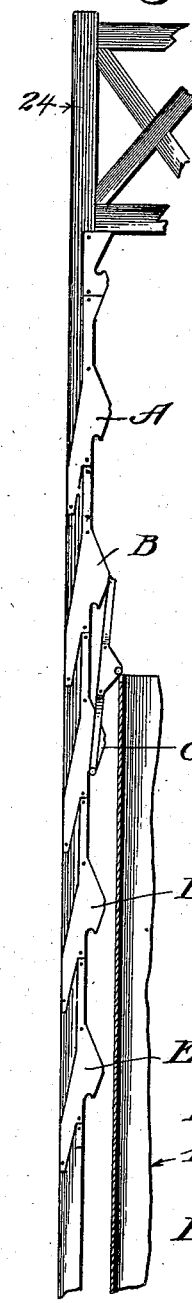
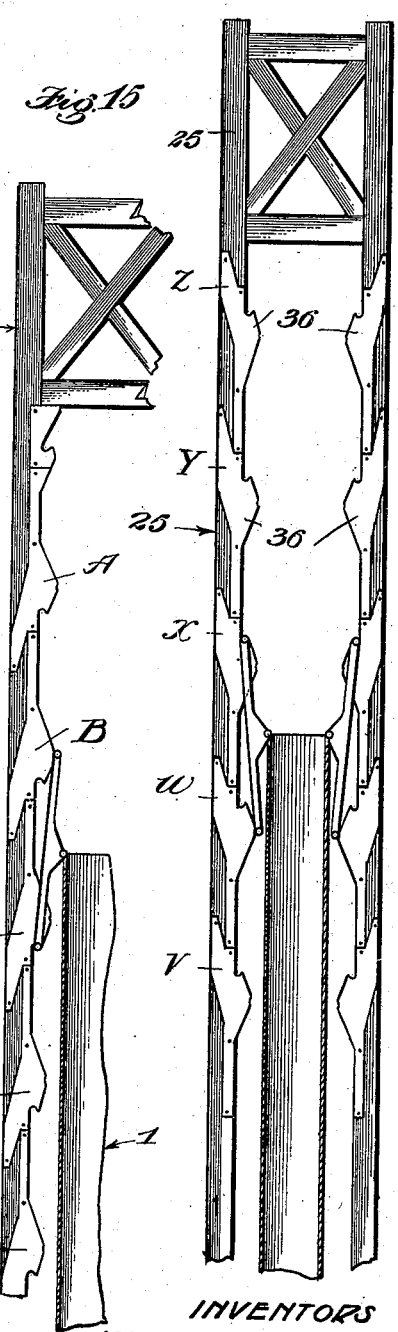
WITNESSES
INVENTORS
MARK D. ROCHFORD
ROBERT T. ROCHFORD
by Townsend Bros.
attys

UNITED STATES PATENT OFFICE.

MARK D. ROCHFORD AND ROBERT T. ROCHFORD, OF LOS ANGELES, CALIFORNIA.

WELL-MAKING MACHINE.

No. 867,536.  Specification of Letters Patent.  Patented Oct. 1, 1907.

Application filed March 8, 1904, Serial No. 197,064. Renewed August 22, 1907. Serial No. 389,730.

*To all whom it may concern:*

Be it known that we, MARK D. ROCHFORD and ROBERT T. ROCHFORD, both citizens of the United States, and both residents of Los Angeles, in the county of Los Angeles and State of California, have invented a new and useful Well-Making Machine, of which the following is a specification.

This invention relates to a machine designed for forming shafts in the ground, and for sinking a casing in a shaft simultaneously with the formation of a shaft. The machine also provides means for pulling up a previously sunk casing.

The invention comprises a machine which will form a shaft and simultaneously sink a casing to strengthen the walls of the shaft and permit of access to below the surface of the earth for the introduction of suitable mediums below the surface adapted to assist the percolation of underground water, or for conveying water underground, such for instance, as coarse gravel between layers of finer gravel, or tiling, or tiling surrounded by gravel or coarse sand. The main object sought is to place the tile or other medium suitably in the earth below the surface of the water without removing the water to any great extent.

The machine sinks casings one after the other, and facilitates the sinking of a casing by digging away and removing the earth at the bottom of the casing as the casing goes down. Thus a shaft is formed as the casing sinks and the shaft is lined by the casing as fast as it is formed. As the work proceeds, the machine pulls up previously sunk casings and it is preferred to pull up a previously sunk casing simultaneously with the sinking of a new casing to economize time.

Another object of the invention is to provide means whereby the tiling or other medium may be placed in the ground and covered over as soon as placed in position, so that the ground is unbroken except at the spot where the work is being performed; the work of making the excavation and inserting the tiling being performed at one stand of the machine, so that in laying a line of tiling or other percolating medium, the work on the line so far as the line is completed is always practically in a finished state. This is a great advantage as it concentrates the work at one point and enables the entire work to be performed under the direction of a single engineer or overseer.

The machine is especially designed for laying tile or percolating medium, such as coarse gravel or sand in so-called arid districts, the formation of the earth in such places being usually of sand; and the excavation of the shaft can be accomplished without removing the water that causes the sand to be carried into the shaft, and obviates the necessity of removing all the water before the work can be accomplished.

Another object is to provide means whereby the digging may be quickly and easily interrupted without stopping the machine and whereby the immediate digging mechanism may be quickly withdrawn from the work up through the casing.

The machine is especially adapted for carrying out the process invented by Mark D. Rochford for making wells, filed Aug. 4, 1902, Serial Number 118,399.

Other objects of the invention relate to the effective performance of various functions of the machine, and to the construction of parts which perform those functions, and will be fully brought out in the following.

The accompanying drawings illustrate the invention and referring to the same:—Figure 1 is a perspective view of the machine in operation. Part of the ground below the machine has been shown in section to give a view of a casing which is being sunk, a casing which is completely sunk, of a casing which is being withdrawn, and of tile which have been placed in position. Fig. 2 is a view in perspective with the ground broken away to show graphically the tile, the gravel surrounding the tile, and the relative position of casings which they have during certain steps in the performance of the work. Fig. 3 is a side elevation of the machine. Fig. 4 is a plan view of the machine. Fig. 5 is a front elevation of the machine, enlarged, the front being regarded as facing the direction in which the machine is moved during successive stages of the work, with the fore part of the machine removed. The casing is shown as having been partially sunk into the ground, the ground being shown in section. Fig. 6 is a sectional view taken on line $X^6$—$X^6$, Fig. 5. Fig. 7 is a plan view of the main base, the superstructure being removed above the section line $X^7$—$X^7$ Fig. 6. Fig. 8 is an enlarged detail view of the lower part of a casing in section showing the lower part of the digging loop and follower in side elevation within the casing, and in operating condition in the ground, the ground being in section. Fig. 9 is a view taken on line $X^9$—$X^9$, Fig. 8. Fig. 10 is a view on line $X^{10}$—$X^{10}$, Fig. 9. Fig. 11 is a perspective view of a casing. Fig. 12 is a detail showing the upper part of a casing in section and the adjacent actuating frame connected to it and in its lower position. Fig. 13 is a view similar to Fig. 12 showing the actuating frame at nearly the upper end of its stroke and illustrates the operation of the hook-links when the actuating frame is at an intermediate point of its stroke. Fig. 14 is a view similar to Fig. 12 showing the actuating frame as having been moved to the upper limit of its stroke, with the hook links engaging a new set of hooks preparatory to pulling the casing down a step. Fig. 15 is a view similar to Fig. 12 showing the actuating frame as having been moved down to the bottom of its stroke and the casing as sunk one step. Fig. 16 is a view similar to Fig. 12 but showing the other actuating frame which pulls up the casings. Fig. 17 is a detail in front elevation of a hook link. Fig. 18 is a detail in side elevation of a hook link. Fig. 19 is a detail showing the train of the principal gearing. Fig. 20 is a detail showing the friction wheels of the gearing.

Fig. 2 shows the relationship of the tiles surrounded by a layer of percolating medium, adjacent earth, and lower portions of three casings each in a different position, such as they may have at a certain stage of the work.

The tile may be laid in vertical rows with their ends abutting, or nearly abutting, thus forming horizontal conduits broken only at the adjoining ends of the various tiles. These horizontal conduits may be in a straight line, but there are various ways of laying the tile with or without the gravel or coarse sand, and several arrangements are shown in the before mentioned application. The tile when laid form a well and assist the flow of water, and promote the percolation of water from the surrounding water-bearing strata. The tile may preferably be immediately surrounded by a layer of gravel or coarse sand, as indicated in Fig. 2.

It is usually desirable that the tiles be laid with several vertical rows. The number of vertical rows will depend on the amount of water desired within the required time or upon the amount of water desired to be obtained; but as a general proposition, several vertical rows are required and these rows preferably continue in a substantially straight line.

The casing which we prefer to employ, designated 1 in the drawings, is illustrated in Fig. 2 and Fig. 3 and comprises side plates 2 and a back plate 3. The side and back plate are united by angle bars 4 at the corners. The front edges of the side plates 2 also have similar angle bars 4, and the front part of the casing is made sectional and removable and consists of several plates 5 secured to the angle bars 4 by bolts. These plates are attached to a casing as fast as it is sunk and may be removed as fast as a casing is pulled up, thus, in the operation of the apparatus, that part of the casing which projects above the earth is open at the front while the sunken part is closed by the plates 5.

The reference letters R, S, T will be referred to in describing the operation.

This open front casing is an important feature as it enables the excavated earth to be discharged near the level of the ground. The earth which is excavated does not have to be elevated to the extreme top of the casing as would be the case if the casing were closed on all sides. Thus, no matter what the length of the casing is, the elevation of the excavated earth from the bottom of the casing is always to the same height, above the surface of the ground; that is, a height above the surface of the ground sufficient to give ample room for the necessary machinery. This open front casing permits of employing a strong and solid casing of considerable length which being a longitudinally smooth unit may be readily sunk, and earth excavated, with a machine having concentrated gearing; and when it is considered that in some cases it is desirable to employ casings having a length of thirty feet, it will be seen that a machine to properly raise the excavated earth to the top of the thirty foot casing when the casing had only been sunk a foot or two in the earth, would necessitate rather unwieldy gearing.

In constructing wells in our preferred manner, we employ three casings. One casing is put down; the machine is then moved along a slight distance and the second casing is put down next to the first casing; the machine is then moved along a step and the third casing is put down next to the second casing, and the first casing which had previously been sunk, is pulled up either simultaneously with the sinking of the third casing, or after the third casing has been sunk, or, if preferred, even before the third casing has been sunk. In the preferred manner the casings are sunk in rotation and are pulled up in rotation.

It should be here noted that gravel, or coarse sand, or some medium other than tiling, may be placed in the ground to assist in the percolation and collection of water, and that while we shall refer to tiling in this connection, for the sake of briefness, throughout the specification, it should be understood that the apparatus is equally adapted for the laying of these other percolating mediums.

10 designates a base frame which carries a superstructure comprising four vertical posts 11, which at the top are tied together by a platform frame 12. As shown in Fig. 5, the main superstructure is arranged at one side of the base frame 10 and is braced on one side by inclined struts 13 and on the rear side by inclined struts 14.

An intermediate platform frame 15 is arranged a few feet above the base frame 10 and this frame 15 is supported by the vertical posts 11 and by the inclined struts and serves to not only support some of the driving machinery, but also to strengthen and give the superstructure rigidity.

An inclined frame 16 forming a track for a tension weight is pivotally secured to the superstructure, (see Figs. 1, 3, 4, and 6) there being plates 17 which are attached to the upper end of the inclined frame 16 which are supported by a pintle 18, as shown particularly well in Fig. 6. The lower end of the inclined way 16 may be supported by a shoe 19, the shoe being preferably pivoted thereto to allow it to adjust itself to the angle of inclination of the inclined way.

The inclined way 16 is strengthened by truss rods 20 and may be supported at an intermediate point by a standard 21. The base frame 10, shoe 19, and standard 21 may advantageously be mounted upon timbers laid upon the ground; and the base frame 10 may preferably be either equipped with wheels or rest upon rollers 22. The shoe 19 may be provided with wheels 23 or rollers.

For sinking and for withdrawing casings we employ actuating frames, designated in a general way by the numerals 24 and 25, respectively. Each actuating frame is slidably mounted upon its respective pair of upright posts 11. Plates 26 are provided on the upright posts to hold the actuating frames against lateral movement, but allow the actuating frames to be slid up and down when required. (See Fig. 5.)

The actuating frame 24 (see Figs. 12 to 15) comprises a pair of vertical bars 27 which are united at the top by cross bars 28. A series of hooks 29 are arranged in pairs on the actuating frame 24, and each hook is provided with a notch 30 and with inclined bearing faces 31 and 32 which converge toward a central notch 33. The hooks 29 are preferably sunk flush with the face of the bar upon which they are mounted. At the upper end of the actuating frame 24 a pair of hooks 34 is arranged with notches 35 reversely situated with respect to the notches 30.

The reference letters A, B, C, D, and E are used to differentiate the hooks 29 in the description of the operation which follows later.

The actuating frame 25 (see Fig. 16) is constructed similarly to the actuating frame 24, but is provided with a series of hooks 36, which, while similar in construction and outline to the hooks 29, are reversely arranged, as shown. Underneath each actuating frame is a pair of hydraulic jacks 37, as shown in Fig. 5, the pistons of which are connected by rods 38 with the lower ends of each actuating frame. Either actuating frame may be independently shifted up or down a definite throw by means of its pair of hydraulic jacks.

Each casing is provided at its upper end with bails 39. (See Fig. 11.) Referring to Figs. 17 and 18, 40 designates in a general way hook links. Each hook-link comprises bows 41 which are united at their ends by cross bars 42 and braced by struts 43. Each bow has a plate 44 which is provided with a notch 45. The notches 45 are adapted to engage with the bails 39 on the casings as shown in Figs. 12 to 16, and the hook links are adapted to engage with the hooks on the actuating frames so that the casings may be pushed down step by step as shown in Figs. 12 to 15, or pulled up step by step, as shown in Fig. 16.

Reference will now be made to Figs. 12 and 16 inclusive. For convenience of description as many of the hooks 29 as are shown on the actuating frame 24 will be differentiated by the letters A, B, C, D and E, while the correspondingly located hooks 36 on the actuating frame 25 will be designated V, W, X, Y, Z.

Referring to Fig. 12 it will be seen that a pair of hook links 29 are in engagement with the bails of the casing to be sunk and that the lower cross bars of each hook link engage the notches 30 of hooks B, the upper cross bars of the hook links engaging the notches 33 in the hooks A. If now, the hydraulic jacks are operated to pull down the actuating frame 24, the hooks B will draw upon the hook links and thus draw down the casing as the upper ends of the hook links are held inwardly toward each other to keep their notches 45 in engagement with the bails 39. As soon as the hydraulic jacks have reached their lower termination of stroke they are reversed and moved upwardly, thereby raising the actuating frame. As the actuating frame rises, the engagement of the bails 39 with the hook links prevents the hook links from rising, and the hooks B rise from the lower bars of the hook links, and as the hooks B move upwardly their inclined bearing faces 31 bear against the lower struts 43 of their respective hook links and gradually tilt the hook links, so that the upper ends of the hook links spread apart and their lower ends are drawn toward each other, and the upper bars of the hook links contact with the inclined bearing faces 32 of the hook A as the lower ends of the hooks are moved in by the inclined bearing faces 32 on the hooks B. This action is illustrated in Fig. 13, which figure shows the hook links as having been tilted to nearly a vertical position. Continued upward movement of the actuating frame brings the hook links into such position that their lower cross bars engage the notches 30 in the hooks C and its upper cross bar rests in the notch 33 in the hook B, as in Fig. 14. When the hook link has reached the position indicated in Fig. 14, the hydraulic jacks are at the upper termination of their stroke. The hydraulic jacks are then reversed and moved down, carrying the actuating frame with them, and as the actuating frame moves down, it draws the casing 1 with it into the position shown in Fig. 15. By repeating the foregoing operation, the hook links are by successive steps engaged by the succeeding hooks C, D and E, and so on throughout the series of hooks on the actuating frame, and the casing is thus sunk step by step until it is drawn the proper depth.

It will be noted that the hook links are controlled in their action purely by the configuration of the hooks and thus their action is positive and it is practically impossible for any derangement of mechanism to occur. The hook links can not slip off from the bails as the inclined faces on the hook are so arranged that while they allow the tilting of the hook links as fast as the actuating frame is moved, they do not permit any lost motion of the hook links. The purpose of the upper hooks 34 will be described later.

The operation of pulling up a casing by means of the actuating frame 25 is accomplished similarly but in reverse to the manner in which the actuating frame 24 pulls down the casing, the hooks V, W, X, Y, Z, successively engaging the hook links, step by step, as the casing is pulled up.

The Figs. 12 to 15 inclusive are arranged on the drawing with definite relation to a fixed line of elevation as for instance, the top of the casing, as shown in Figs. 12, 13 and 14, is at the same elevation not having been sunk a step, while the relative positions of the actuating frame at the different stages relatively to the casing are seen at a glance. In Fig. 15 the actuating frame has again moved to its lowest position on a level with the position it has in Fig. 12, but of course the casing has been moved down one step.

The excavating of the shaft in which a casing goes down and in which the tile are to be laid, is accomplished simultaneously with the sinking of a casing, and is performed by an endless digging chain 50. (See Figs. 5, 6, 8, 9, and 10.) In the present embodiment the digging chain comprises a pair of single chains arranged side by side, between which, at intervals, are scoops or buckets 51 so constructed as to dig up earth and elevate it as the digging chain is actuated. (See particularly Figs. 5 and 6.) If desired, between the scoops diggers 52 may be arranged as shown in Fig. 10. These diggers 52 break up and loosen the earth and facilitate the removal of it by the scoops.

Referring now to Figs. 5 and 6, 53 is a shaft mounted on the superstructure which carries sprockets 54. A pair of idle sprockets 55 is carried by a shaft 56 which is mounted on the plate 17 before described. Another pair of sprockets 57 is mounted on a shaft 58 at the upper end of the inclined way 16. A pair of idle sprockets is carried by a tension weight in the form of a car 59 which rides upon the inclined track 16, the car being a receptacle for sand or other ballast.

The digging chain passes over the sprockets 54, 55, 56, 57 and the idle sprockets on the car 59, hanging in a loop from the sprockets 54, and 55, and inclosed by a casing as shown in Fig. 6. In order to keep the vertical loop which will be termed the "digging loop", of the chain taut and to maintain the proper resistance when the digging chain is at work, a follower weight 60 is provided which comprises a central thick web 61 having side plates 62; (see Figs. 8, 9, and 10).

63 is a shaft at the lower end of the web 61, and mounted on the shaft 63 are a pair of sprockets 64 over which the digging chain passes. The shaft 63 extends through the side plates 62 and carries spiders 65. Two arms of a spider may have plain points, while two other arms of the spiders may have shear blades, as shown. At the upper end of the plates, rollers may be employed to serve as antifriction devices for guiding the digging chain and preventing the chain from scraping against the web 61, and they further are a means for maintaining the follower weight in a vertical position. The side plate 62 may have guards 66 turned up from the edges to protect the digging chain. The digging chain thus has two loops, one of which, the digging loop lies inside the casing, while the other loop from which is hung the tension weight 59, lies outside the casing. Thus, the digging chain is balanced, so to speak, by reason of there being a weight at both of its loops, and the digging chain is driven from the sprockets 54. The follower weight 60 is fitted so as to freely slide within the casing, and as the digging chain is driven, the buckets 51 sweeping around the sprockets on the follower weight, scoop up the earth at the bottom of the casing and carry it up as far as the sprocket 54, and as the digging chain makes its turn over the sprockets 54, the scoops are tilted and discharge their earth, as shown in Fig. 6, onto a trough 67 which is supported by hangers 68 and 69 depending from the inclined way 16.

A sprocket 70 is mounted on the shaft 58 and connected by a chain 71 with a sprocket 72 mounted on a shaft 73. The shaft 73 is journaled in a forked lever 74 and the forked lever 74 is pivoted at 75 to the frame; the shaft 73 also carries a friction wheel 76. Another friction wheel 77 is mounted on a shaft 78, and the friction wheel 76 is normally held against the friction wheel 77 by a spring 79. A sprocket 80 is mounted on the shaft 78 and is connected by a chain 81 with a sprocket 82 on the shaft 53.

83 is a shaft mounted at one side of the superstructure, as shown in Fig. 5, in bearings 84 and carries a sprocket 85 and a drive wheel 86. The sprocket 85 is connected by a chain with a sprocket 87 on the shaft 78. The outer end of the shaft 83 carries a sprocket 88 which is connected by a chain 89 with a sprocket 90 on a shaft 91 on the base frame 10, and the shaft 91 may be driven through the medium of an engine 92.

In order to move the apparatus along in either direction, a cable 93 may be passed over a drum 94, with a few turns, and attached to stationary objects, such as stakes 95 and 96.

In operation, the first casing which is sunk, which for convenience of description will be designated R, is placed in position within the actuating frame 24, with its hooked links in engagement with the uppermost hooks of the actuating frame, the actuating frame being in its upper position. The digging chain is driven through the medium of the gearing before described, the friction wheel 76 normally being in contact with the friction wheel 77 so that the sprockets 70 and 57 on shaft 58 are driven a trifle faster than the sprockets 82 and 54 on shaft 53; thus, as the digging chain is driven, the buckets dig and scoop up the earth at the bottom of the casing and as the work proceeds the digging loop of the chain gradually descends, owing to the shaft 58 and sprockets 57 moving faster than the shaft 53 and sprockets 54 (the sprockets 55 are merely idlers), thus driving the descending reach of the digging chain faster than the ascending reach, which results in gradually lowering the follower weight as the buckets cut their way. As the digging chain removes the earth at the bottom of the casing, the hydraulic jacks 37 are actuated to pull down the actuating frame 24, and with it the casing R, and when the casing R has been pulled down the length of the stroke of the actuating frame, the hydraulic jacks are reversed to shift the actuating frame up and get a fresh grip on the casing, which upward movement of the actuating frame and reëngagement with the casing does not necessitate any stoppage of the other machinery which drives the digging chain, and as soon as the actuating frame has taken a fresh grip on the casing, the hydraulic jacks are actuated again to pull down the actuating frame and with it the casing another step. The downward progress of the casing may be as gradual as desired consistent with the degree of progress made by the digging chain. The detachable plates 5 are secured to the casing as fast as it is sunk, and the process is continued, the casing being sunk gradually step by step and the digging chain being continuously operated. After the casing R has been sunk as far as may be by the regular operation of the actuating frame, its upper end may be somewhat above the surface of the earth and to fully sink the casing flush with the ground timbers may be placed as struts between the upper edge of the casing and the lower hooks of the actuating frame. The casing should be sunk sufficiently low to permit of the apparatus being shifted along over it to start a fresh casing. After the first casing R has been sunk, the apparatus may be pulled along through the medium of the engine, as shown, and another casing placed within the actuating frame 24 and just in advance of the casing which has been sunk, so that the back wall of the second casing, which will be designated S, is immediately in front of and next to the front of the first casing R, and the casing S is sunk in a manner similar to the first casing. The apparatus is then further shifted along, and a third casing T is placed immediately forward of the second casing S and within the actuating frame, and sunk similarly to the other two. This general method of work may be the better understood by reference to Fig. 2. In this figure details of the casing construction have been eliminated owing to the small size of the view and as being unnecessary for the purpose of the view.

The actuating frames 24 and 25 are so spaced that when the three casings have been sunk, the actuating frame 24 lies over the casing T, while the actuating frame 25 lies directly over the casing R. In order to expedite the work, the casing R may be pulled up by the actuating frame 25 during the sinking of the casing T by the actuating frame 24, this being accomplished by connecting the actuating frame 25 to the casing R by the hook-links, as shown in Fig. 16, and the casing R pulled up step by step, by the up-and-down action of its actuating frame 25 as moved by its hydraulic jacks.

If at any time it is desired to raise the digging chain up from its position at the bottom of the casing, it may readily be accomplished by shifting the lever 74 so that the friction wheel 76 will disengage the friction wheel 77. When this is done the sprocket 57 stops running and is held stationary through inertia and friction and the car 59, but the sprocket 54 continues to rotate and the ascending reach of the digging chain is thus alone propelled, the descending reach of the digging chain remaining stationary and thus the follower weight is quickly drawn up, the tension weight or car 59 descending its inclined way to take up slack in the free loop of the chain. Thus it is possible to instantaneously retract the digging loop from the work by a simple movement of the lever 74 and to again bring the digging loop against the work by releasing the lever 74 and throwing the two friction wheels into engagement so that the sprocket 70 is driven to propel the descending reach of the digging chain.

After the third casing T has been sunk, the first casing R is pulled nearly up by the actuating frame 25, a sufficient length of the casing being left in the ground so that the casing will be self supporting, the hook links are then removed to free the casing from the actuating frame 25 and the apparatus is then moved back so that the actuating frame 24 embraces the casing. The casing is then connected by the hook links with the hooks 35 at the extreme upper end of the actuating frame 24 which is then moved up and the casing is thereby completely extracted from the ground. The apparatus is then moved forward with the casing R hanging from the hooks until the casing R hangs directly in front but above the sunken casing T. By this manner the casings are easily and quickly handled and moved forward as required. By this forward movement of the apparatus the actuating frame 25 will have been brought directly over the sunken casing S. The casing R is then sunk and the casing S is pulled up in the above described manner. Thus the three casings are sunk and pulled up in rotation, one after the other, as the machine is advanced step by step from one stand to another. After the casing has been sunk, the tile are lowered down the casing from the top and gradually piled up inside the casing, being laid one on top of the other as illustrated, to the required height, and after the tile have been laid in the sunken casing, the casing is pulled up. Thus, as the apparatus advances over the ground it leaves behind it a continuous line of vertical rows of tile, the ends of which are slightly spaced apart.

The diameter of a tile is considerably less than the width of a casing; considerable space being left between the sides of the tile and the casing and this space on both sides of the tile is preferably filled with a percolating material, such as coarse sand or gravel, either before the casing is pulled up or after the casing is pulled up; it is preferred, however, to fill this space before the casing is pulled up.

The tile may be guided down the casing and retained in a vertical row by any expedient, such for instance, as introducing a couple of planks down the casing between which the tile are held, or one tile may be laid at a time and the space on either side of it filled in with the percolating material and then another tile laid on top of the first tile, and the space on the side of the second tile filled in with the percolating material, and then a third tile laid on the second tile, and the space filled as before and so on.

It is apparent from the foregoing that only the three casings are required to fulfil all of the functions of the apparatus and perform the work.

It is apparent that it is not necessary to sink the casings to their full length as the interior of the casing is always accessible from the surface of the ground, owing to the fact that its open front is only closed up as fast as the casing is sunk so that the tile may be introduced readily from the surface of the ground without having to elevate them above the surface of the ground to reach the top of the casing. Furthermore, the elevation of the dirt removed by the digging chain is carried only a short distance above the surface of the earth, that is, a distance necessary to run it into the trough from which it is delivered; and whatever the height of the casings, the elevation of the earth will only be to this definite point above the surface of the ground, and as some casings used are thirty feet in length, it will be seen that this is a very important feature. This is made possible by the open front casing.

It is obvious that casings may be employed of various lengths and while it is possible to utilize the longer casings, even when only laying tile a relatively short distance below the surface, it in no wise negatives the employment of shorter casings which under various conditions might be found preferable. For instance, in certain localities, it might be that the depth the tiles are laid is not great, and in such case, the apparatus as constructed for sinking the casings and laying the tile at a considerable depth may as well be employed for sinking the casing and laying the tile at the less depth.

What we claim is:—

1. A casing, a chain extending into the casing, scoops on the chain, diggers on the chain between the scoops, means for driving the chain and sinking the casing, and means for lowering or raising the chain in the casing.

2. A chain, digging devices on the chain, means for driving the chain, a casing, and means for sinking the casing and for pulling up a casing.

3. A chain, digging devices on the chain, means for driving the chain, a casing means for sinking the casing, and a separate means for pulling up a casing.

4. A chain, digging devices on the chain, means for driving the chain, a casing having an open front, and means for sinking the casing.

5. An open front casing, a chain digging devices on the chain, means for suspending the chain with one loop within the casing and the other loop without the casing, and means for driving the chain.

6. A casing, means for sinking the casing, a chain, digging devices on the chain, means for supporting the chain with a loop in the casing, means for driving the chain, and means for lowering the loop of the chain.

7. A casing, means for sinking the casing, a chain, digging devices on the chain, means for supporting the chain with a loop in the casing, a follower weight hung in the loop, and means for driving the chain.

8. A casing having an open front, a chain digging devices on the chain, means for supporting the chain with a loop in the casing, means for driving the chain, and means for guiding a reach of the chain through the open front of the casing.

9. A casing, means for sinking the casing, a chain, digging devices on the chain, means for supporting the chain with a loop in the casing, a follower weight hung in the loop in the casing, and a tension weight hung from another loop of the chain.

10. A casing, means for sinking the casing, a chain, digging devices on the chain, means for supporting the chain with a loop in the casing, and means for driving one reach of the chain faster than the other.

11. A casing comprising side plates, a back plate, and a plurality of detachable sectional front plates.

12. A casing comprising side plates, a back plate, and a plurality of detachable sectional front plates, and bails on the casing.

13. An actuating frame, means for supporting the frame, means for moving the frame up and down, a casing, a connection between the frame and the casing, a chain, digging devices on the chain, means for supporting the chain with a loop in the casing, and means for driving the chain.

14. An actuating frame, means for supporting the frame, means for moving the frame up and down, a casing, means for automatically catching the casing and moving it down with the actuating frame.

15. An actuating frame, means for supporting the frame, means for moving the frame up and down, a casing, means for automatically catching the casing and moving it down with the actuating frame, and means for automatically releasing the casing when the actuating frame moves up.

16. A base frame, a superstructure, and actuating frames on the superstructure.

17. A base frame, a superstructure, an actuating frame slidably mounted on the superstructure, said actuating frame comprising vertical bars and hooks carried by the bars.

18. A base frame, a superstructure thereon, an actuating frame slidably mounted on the superstructure, said actuating frame comprising a pair of vertical bars, a plurality of hooks on each bar, said hooks having inclined bearing edges which converge toward an intermediate point on the hook.

19. A base frame, a superstructure thereon, an actuating frame slidably mounted on the superstructure, said actuating frame comprising a pair of vertical bars, a plurality of hooks on each bar, said hooks having inclined bearing edges which converge toward an intermediate point on the hook, said hook having a notch formed at said intermediate point.

20. A base frame, a superstructure thereon comprising a plurality of upright posts, a platform frame at the top of the posts, another platform formed at an intermediate point on the posts, said superstructure being located at one side of the base frame and inclined braces from the base frame to the superstructure.

21. A base frame, a superstructure thereon, an inclined frame extending from the superstructure, an open-front casing, means on the superstructure for sinking a casing, a digging chain, means on the superstructure for driving the digging chain, the free loop of the digging chain extending along the inclined frame, and a tension weight hung in the free loop and resting on the inclined frame.

22. A base frame, a superstructure thereon, an inclined frame extending from the superstructure, an open-front casing, means on the superstructure for sinking a casing, a digging chain, means on the superstructure for driving the digging chain, the free loop of the digging chain extending along the inclined frame, a tension weight hung in the free loop and resting on the inclined frame, and a suitable trough suspended underneath the upper part of the inclined frame.

23. A base frame, a superstructure thereon, an inclined frame extending from the superstructure, an open-front casing, means on the superstructure for sinking a casing, a digging chain, means on the superstructure for driving the digging chain, the free loop of the digging chain extending along the inclined frame, a tension weight hung in the free loop and resting on the inclined frame, and a standard connected to the inclined frame at an intermediate point for supporting the frame.

24. A base frame, a superstructure thereon, an inclined frame extending from the superstructure, an open-front casing, means on the superstructure for sinking a casing, a digging chain, means on the superstructure for driving the digging chain, the free loop of the digging chain extending along the inclined frame, a tension weight hung in the free loop and resting on the inclined frame, and a shoe pivoted at the lower end of the inclined frame.

25. A base frame, a superstructure thereon, an inclined frame extending from the superstructure, an open-front casing, means on the superstructure for sinking a casing, a digging chain, means on the superstructure for driving the digging chain, the free loop of the digging chain extending along the inclined frame, a tension weight hung in the free loop and resting on the inclined frame, said tension weight comprising a gear mounted on the inclined frame, idle sprockets on the gear over which passes the digging chain, and a suitable weight carried by the car.

26. A base frame, a superstructure mounted thereon, an inclined frame pivoted to the superstructure, two pair of chain driving sprockets, a digging chain the two reaches of which pass over respectively the two pair of chain driving sprockets, and means for driving one of said pair of sprockets faster than the other.

27. A base frame, a superstructure mounted thereon, an inclined frame pivoted to the superstructure, two pair of chain-driving sprockets, a digging chain the two reaches of which pass over respectively the two pair of chain-driving sprockets, means for driving one of said pair of sprockets faster than the other, and means for stopping the rotation of one of said pair of sprockets.

28. A base frame, a superstructure mounted thereon, an inclined frame pivoted to the superstructure, two pair of chain-driving sprockets, a digging chain the two reaches of which pass over respectively the two pair of chain-driving sprockets, means for driving one of said pair of sprockets faster than the other, said last means comprising suitable gearing embracing two friction wheels, and means for swinging one of said friction wheels into or out of engagement with the other.

29. An actuating frame, suitable hooks thereon, an open-front casing bails on the casing and hooked links engaging said bails and said hooks, and said hooks having inclined edges which converge toward an intermediate point.

30. A base frame, a superstructure mounted thereon, a pair of parallel actuating frames mounted on the superstructure, a plurality of open-front casings, means for connecting a casing with an actuating frame for moving the casing down and up, a digging chain, means for suspending the chain with its digging loop substantially in a line with the actuating frame within the adjacent casing, and suitable gearing for driving the digging chain.

31. A base frame, a superstructure mounted thereon, a pair of parallel actuating frames mounted on the superstructure, a plurality of open-front casings, means for connecting a casing with an actuating frame for moving the casing down and up, a digging chain, means for suspending the chain with its digging loop substantially in a line with the actuating frame within the adjacent casing, suitable gearing for driving the digging chain, and means for driving the gearing and for shifting the base frame along.

Signed at Los Angeles, Los Angeles Co., California, Feb. 27, 1904.

MARK D. ROCHFORD.

Witnesses:
GEORGE T. HACKLEY,
JULIA TOWNSEND.

Signed at Los Angeles, Los Angeles Co., California, Feb. 29th, 1904.

ROBERT T. ROCHFORD.

Witnesses:
GEORGE T. HACKLEY,
JULIA TOWNSEND.